United States Patent [19]

Masuda et al.

[11] Patent Number: 5,198,777
[45] Date of Patent: Mar. 30, 1993

[54] PAPER THICKNESS DETECTING APPARATUS HAVING A RESONATOR WITH A RESONANCE POINT SET BY A CAPACITANCE DETECTING UNIT

[75] Inventors: Noboru Masuda, Kawaguchi; Tetsuo Oosawa, Tokyo; Yasutaka Fujii, Sagamihara, all of Japan

[73] Assignee: Murata Mfg. Co., Ltd., Kyoto, Japan

[21] Appl. No.: 654,425

[22] Filed: Feb. 12, 1991

[30] Foreign Application Priority Data

Feb. 14, 1990 [JP] Japan .................................... 2-13276
Feb. 16, 1990 [JP] Japan .................................... 2-35571

[51] Int. Cl.⁵ ........................................... G01R 27/26
[52] U.S. Cl. ................... 324/671; 324/672; 324/675; 324/682
[58] Field of Search ............... 324/662, 661, 671, 672, 324/675, 682, 679, 686, 663; 271/263

[56] References Cited

U.S. PATENT DOCUMENTS

| | | | |
|---|---|---|---|
| 2,562,575 | 7/1951 | Raesler. | |
| 3,300,716 | 1/1967 | Engert | 324/675 X |
| 3,341,774 | 9/1967 | Dyben | 324/663 |
| 3,519,922 | 7/1970 | Nash et al. | 324/675 X |
| 3,609,735 | 9/1971 | Dauterman et al. | 271/263 X |
| 4,528,655 | 7/1985 | Tamura et al. | 324/661 X |
| 4,951,800 | 8/1990 | Yoshihara. | |

FOREIGN PATENT DOCUMENTS

| | | |
|---|---|---|
| 0097570 | 1/1984 | European Pat. Off. . |
| 0289212 | 11/1988 | European Pat. Off. . |
| 2539212 | 3/1976 | Fed. Rep. of Germany . |
| 1297916 | 5/1962 | France . |

OTHER PUBLICATIONS

Measurement Techniques vol. 32, No. 7, Jul. 1989, pp. 647-649, N.Y., U.S.; V. K. Fedotov: "Capacitance Thickness Range for Conducting Films".

Primary Examiner—Jack B. Harvey
Attorney, Agent, or Firm—Townsend and Townsend

[57] ABSTRACT

Apparatus for detecting thickness which includes an electrode detecting unit including a ground electrode and a detecting electrode. The electrodes oppose each other along a paper path. An oscillating circuit provides an oscillation frequency signal. A resonant circuit, having a resonator independent of the oscillating circuit, has a resonance point which changes in accordance with a change in electro-static capacitance corresponding to a change in paper thickness detected by the electrode detecting unit. A resonant circuit outputs a detection signal corresponding to the change in resonance point. By analyzing this detecting signal, a state of two sheets of paper passing through the path is detected as a change in paper thickness.

9 Claims, 6 Drawing Sheets

PAPER THICKNESS DETECTING APPARATUS HAVING A RESONATOR WITH A RESONANCE POINT SET BY A CAPACITANCE DETECTING UNIT

BACKGROUND OF THE INVENTION

1. Field of the Invention

The present invention relates to a paper thickness detecting apparatus using an electrostatic sensor device.

2. Description of the Prior Art

In a copying machine or a bill identification system, various troubles occur if two sheets of paper are fed. For this reason, these systems include a paper thickness detecting apparatus. When two sheets of paper are fed, the apparatus detects this and stops the system, or the two sheets of paper are discharged by discharging means.

Figure 1:
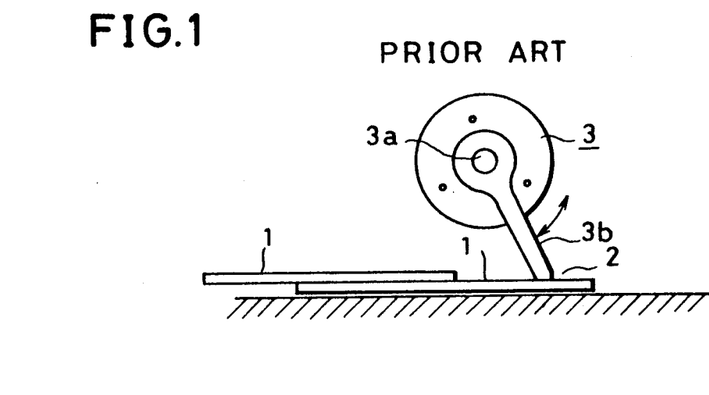
FIG. 1 is a view showing a conventional paper thickness detecting apparatus.

FIG. 1 shows a general paper thickness detecting apparatus used in a copying machine or a bill identification system as described above. In this apparatus, a potentiometer 3 is arranged on a path 2 of paper 1. This potentiometer 3 includes a rotating shaft 3a and a probe 3b mounted on the rotating shaft 3a, and the distal end of the probe 3b is constantly biased against the paper 1 so as to be in contact with the paper 1. The probe 3b is rotated in a direction indicated by an arrow as a paper thickness changes, and a rotational angle of the probe 3b is converted into a voltage change and extracted.

In a conventional apparatus using a potentiometer, however, a paper thickness is detected while the probe 3b is in contact with the paper 1. When a running speed of paper is increased, therefore, the movement of the probe 3b cannot follow the movement of the paper. Therefore, the running speed of paper is limited.

In addition, since a change in thin paper such as a copying sheet or bill is detected by the rotational angle of the probe 3b, a change in rotational angle of the probe 3b with a change in paper thickness obtained when two sheets of paper are fed is very small. In order to correctly detect a change in paper thickness, therefore, the potentiometer 3 must have very high precision. As a result, the arrangement of the apparatus is complicated, and the manufacturing cost of the apparatus is increased.

SUMMARY OF THE INVENTION

The present invention has been made to solve the above conventional problems and has as its object to provide a paper thickness detecting apparatus having a simple arrangement and capable of detecting a change in paper thickness with high precision even if a running speed of paper is increased.

In order to achieve the above object of the present invention, there is provided a paper thickness detecting apparatus comprising an electrode detecting unit constituted by a ground electrode and a detecting electrode arranged to oppose each other in upper and lower positions of a paper path, an oscillating circuit for oscillating an oscillation frequency signal, and a resonant circuit, having a resonator independently of the oscillating circuit, for changing a resonance point in accordance with a change in electrostatic capacitance corresponding to a change in paper thickness detected by the electrode detecting unit.

In the present invention, when paper passes through the paper path, a permittivity between the ground electrode and the detecting electrode of the electrode detecting unit changes, a change in paper thickness is detected as a small change in electrostatic capacitance by the electrode detecting unit, and the detection result is supplied to the resonant circuit. The resonant circuit shifts a resonance point in correspondence with the change in small electrostatic capacitance detected by the electrode detecting unit and outputs a detection signal corresponding to the change in resonance point. By analyzing this detection signal, a state of two sheets of paper passing through the path is detected as a change in paper thickness.

In addition, in order to achieve the above object of the present invention, there is provided a paper thickness detecting apparatus comprising first and second detecting electrodes arranged in front and rear positions of a running path region of paper in a non-contact state with paper, an oscillating circuit for oscillating an oscillation frequency signal, a first resonant circuit, having a resonator independently of the oscillating circuit, for changing a resonance point in response to a change in electrostatic capacitance detected by the first detecting electrode and outputting a detection signal corresponding to the change in resonance point, a second resonant circuit, having a resonator independently of the oscillating circuit and the resonator of the first resonant circuit, for changing a resonance point in response to a change in electrostatic capacitance detected by the second detecting electrode and outputting a detection signal corresponding to the change in resonance point, and an output circuit for outputting a signal indicating a difference between the detection signals from the first and second resonant circuits.

In the above paper thickness detecting apparatus, assume that the first detecting electrode is arranged on the upstream side of the running path region and the second detecting electrode is arranged on the downstream side thereof. In this case, when paper comes along the running path region to the position of the first detecting electrode, the paper is detected as a change in electrostatic capacitance in a detection region of the first detecting electrode, and the detection result is supplied to the first resonant circuit. Similarly, when the paper reaches the second detecting electrode, the paper is detected as a change in electrostatic capacitance in a detection region of the second detecting electrode, and the detection result is supplied to the second resonant circuit. The first and second resonant circuits shift resonance points in response to the changes in electrostatic capacitances supplied from the corresponding detecting electrodes and supply detection signals indicating paper thicknesses corresponding to the changes in resonance points to the output circuit. The output circuit obtains a difference between the detection signals supplied from the first and second resonant circuits and supplies the differential signal to a desired signal processing circuit for arithmetically operating a paper thickness or the like.

DETAILED DESCRIPTION OF THE PREFERRED EMBODIMENTS

Figure 2:
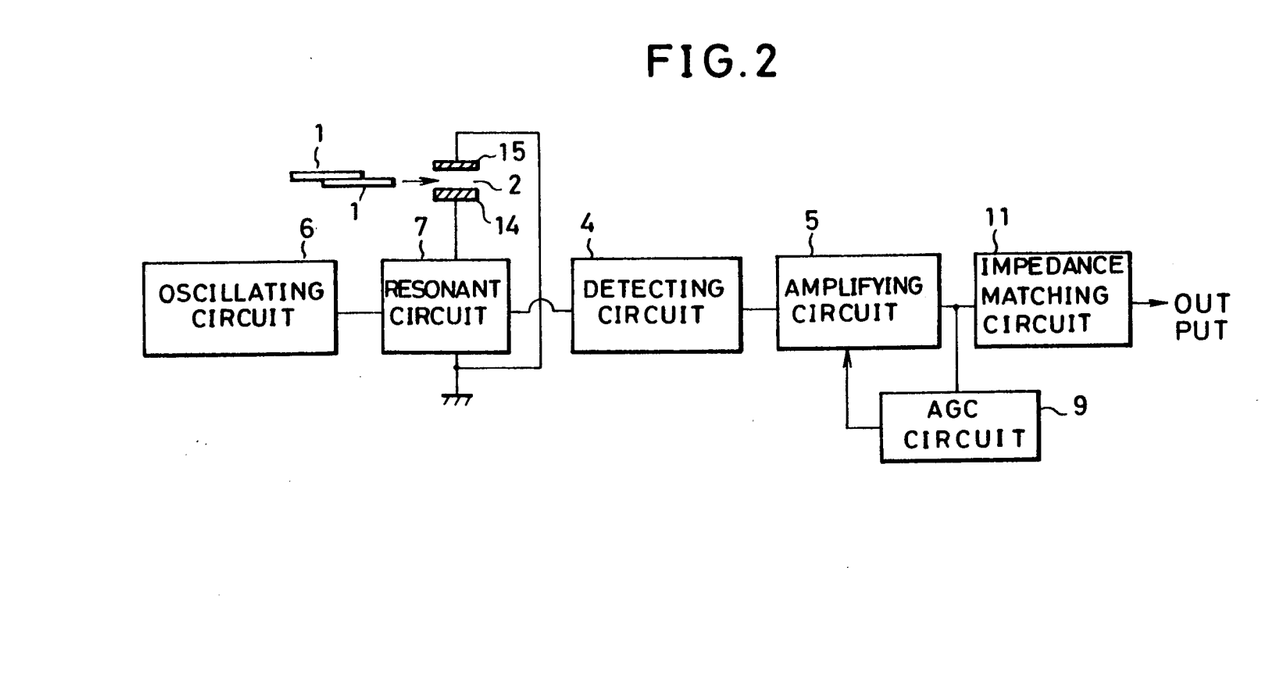
FIG. 2 is a block diagram showing the first embodiment of a paper thickness detecting apparatus according to the present invention.
Figure 3:
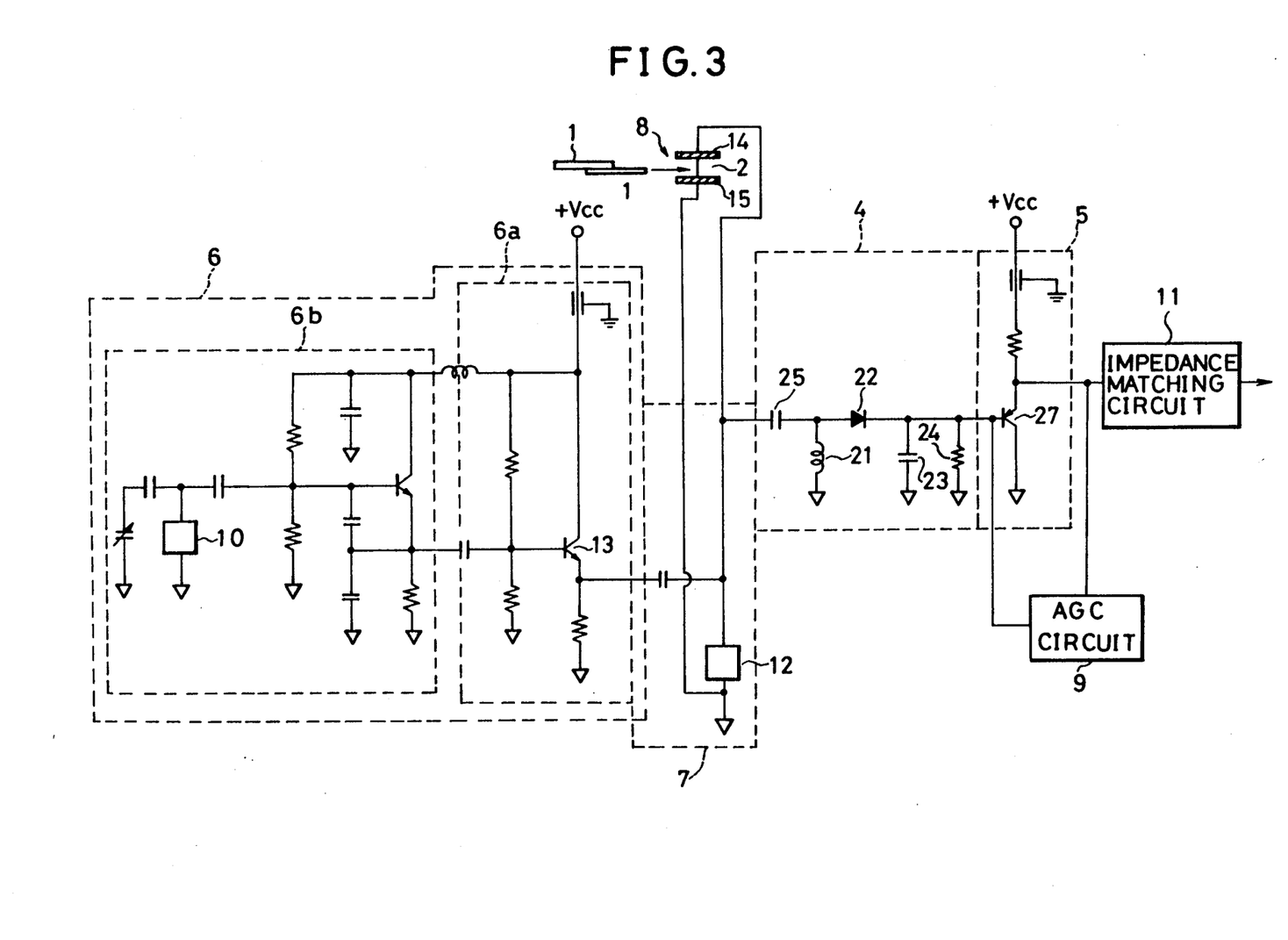
FIG. 3 is a circuit diagram showing the paper thickness detecting apparatus shown in FIG. 2.

The first embodiment of a paper thickness detecting apparatus according to the present invention will be described below with reference to the accompanying drawings. In this specification, a term "paper" is a general term indicating not only a bill and a copying sheet but also a plastic film or sheet. FIG. 2 is a block diagram showing the first embodiment of a paper thickness detecting apparatus according to the present invention, and FIG. 3 is a circuit diagram showing an arrangement of the embodiment in detail. The apparatus of this embodiment comprises an oscillating circuit 6 including a high-impedance converting circuit 6a, a resonant circuit 7, an electrode detecting unit 8, a wave detecting circuit 4, an amplifying circuit 5, an AGC circuit (automatic gain control circuit) 9, and an impedance matching circuit 11. In the circuit shown in FIG. 3 the head of reference symbol ∇ indicates a ground point.

The oscillating circuit 6 is a well known circuit using a ceramic resonator 10 for oscillating an oscillation frequency of a predetermined high frequency fixed within the range of 1 GHz to 10 GHz, e.g., 1 GHz in this embodiment. The oscillating circuit 6 supplies a high oscillation frequency signal to the resonant circuit 7 via the high-impedance converting circuit 6a. The resonant circuit 7 is constituted by a ceramic resonator 12 which is connected to the electrode detecting unit 8. The electrode detecting unit 8 is constituted by a pair of a detecting electrode 14 and a ground electrode 15. The detecting and ground electrodes 14 and 15 are located in upper and lower positions of a path 2 of paper 1 to oppose each other via a passing space of the paper 1. The detecting electrode 14 is connected to the signal input side of the ceramic resonator 12, and the ground electrode 15 is connected to its ground side.

Figure 4:
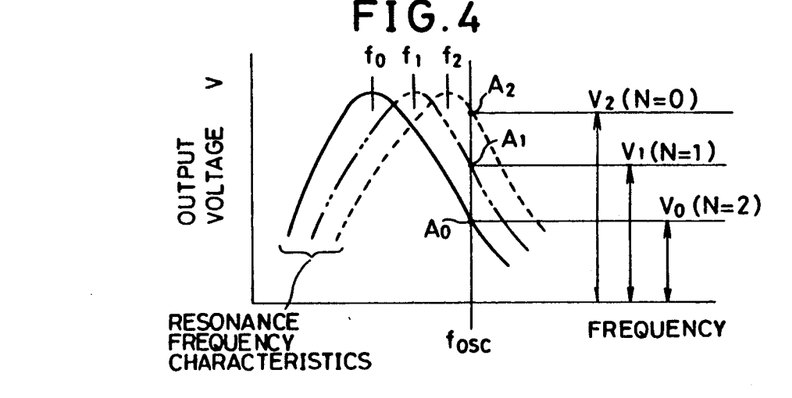
FIG. 4 is a graph for explaining a paper thickness detecting effect according to the embodiment shown in FIG. 2.

The resonant circuit 7 has resonance frequency characteristics, as shown in FIG. 4. Referring to FIG. 4, a fixed oscillation frequency $f_{OSC}$ of the oscillating circuit 6 is slightly deviated from a resonance frequency $f_2$ of the resonant circuit 7. The resonance frequency $f_2$ of the resonant circuit 7 is shifted in accordance with a change in electrostatic capacitance between the electrodes 14 and 15 detected by the electrode detecting unit 8, e.g., shifted to $f_1$ when an electrostatic capacitance C changes by $+\Delta C$. Since the oscillation frequency of the oscillating circuit 6 is fixed at $f_{OSC}$, the resonant circuit 7 supplies an output voltage $V_2$ at a resonance point $A_2$ if the electrostatic capacitance does not change. When the electrostatic capacitance changes to $+\Delta C$, the resonance frequency is shifted to $f_1$ change the resonance point from $A_2$ to $A_1$, and the resonant circuit 7 supplies an output voltage $V_1$. In this manner, the resonance frequency of the resonant circuit 7 is shifted in accordance with the change in electrostatic capacitance between the electrodes 14 and 15, and the resonant circuit 7 supplies the output voltage V corresponding to the electrostatic capacitance change accordingly.

Since a ceramic dielectric generally has a high (large) Q, a high detection sensitivity can be expected by constituting the resonator of the circuit by the ceramic resonators 10 and 12. When the resonant circuit 7 is directly connected to an oscillating circuit unit 6b of the oscillating circuit 6, however, since the impedance of the oscillating circuit unit 6b is lower than that of the ceramic resonator 12 in operation, Q of the resonant circuit 7 is reduced. As a result, since an output voltage at a resonance point is reduced, a satisfactory performance (of high Q) of the resonant circuit 7 cannot be obtained. In order to solve this problem, in this embodiment, the high-impedance converting circuit 6a is provided between the oscillating circuit unit 6b and the resonant circuit 7. The high-impedance converting circuit 6a is constituted as a high-impedance circuit by connecting circuit elements such as a transistor 13, a resistor, and a capacitor. The transistor 13 applies a high impedance to the resonant circuit 7 by an emitter-follower connection and intercepts a mutual interference between the oscillating circuit unit 6b on the ceramic resonator 10 side and the resonant circuit 7 on the ceramic resonator 12 side.

The wave detecting circuit 4 is connected to the resonant circuit 7 via a coupling capacitor 25. This wave detecting circuit 4 is constituted by an inductance element 21, a diode 22, a capacitor 23, and a resistor 24 and receives an output signal from the resonant circuit 7 via the coupling capacitor 25. The diode 22, the capacitor 23, and the resistor 24 constitute a signal detecting circuit, and the inductance element 21 and the capacitor 25 serve as a high-impedance circuit. The wave detecting circuit 4 envelope-detects an output signal from the resonant circuit 7 having a high frequency and converts the signal into a signal for detecting a paper thickness.

The amplifying circuit 5 is constituted by a transistor 27 and an element such as a resistor. The amplifying circuit 5 amplifies a signal supplied from the wave detecting circuit 4 and supplies the signal to a signal processing circuit (not shown) via the impedance matching circuit 11 and to the AGC circuit 9.

The AGC circuit 9 prevents the gain of the transistor 27 from falling outside the set gain range for paper thickness detection due to disturbance such as rumples or a rupture of the paper 1, thereby enabling correct detection of a paper thickness even if the paper 1 has a rupture or rumples.

A paper thickness detection operation of the first embodiment of the present invention having the above arrangement will be described below.

While the paper 1 does not pass between the detecting and ground electrodes 14 and 15, the oscillation frequency $f_{OSC}$ of the oscillating circuit 6 is slightly deviated from the resonance frequency $f_2$ of the resonant circuit 7, as shown in FIG. 4. In this case, the resonant circuit 7 outputs a constant voltage $V_2$. In this state, when a sheet of the paper 1 (paper of N=1 where N is the number of sheets of paper) passes between the detecting and ground electrodes 14 and 15 through the path 2, the permittivity between the electrodes 14 and 15 changes, and the electrostatic capacitance between the electrodes 14 and 15 changes. In response to this small change in electrostatic capacitance, the resonance frequency of the resonant circuit 7 is shifted from $f_2$ to $f_1$ with respect to the oscillation frequency $f_{OSC}$ of the oscillating circuit 6, the resonance point changes from $A_2$ to $A_1$, and the resonant circuit 7 outputs a voltage $V_1$. Similarly, when two sheets of the paper 1 are simultaneously fed between the electrodes 14 and 15 through the path 2, the permittivity between the electrodes 14 and 15 further changes, the resonance frequency of the resonant circuit 7 is shifted to $f_0$, the resonance point changes from $A_1$ to $A_0$, and the resonant circuit 7 outputs a voltage $V_0$. The resonant circuit 7 forms an amplitude modulation wave in accordance with the change in output voltage corresponding to the paper thicknesses and supplies the modulation wave to the wave detecting circuit 4. That is, the resonant circuit 7 performs multiplication between the oscillation frequency $f_{OSC}$ and a change component $\Delta f$ of the resonance frequency corresponding to the change in paper thickness and obtains the amplitude modulation (AM) wave. In this embodiment, since the oscillation frequency $f_{OSC}$ is 1 GHz, a detection signal as a modulation wave is obtained as a signal having a high frequency corresponding to the change in paper thickness and having a frequency of 1 GHz as the center, and this signal having a high frequency is supplied to the wave detecting circuit 4.

The wave detecting circuit performs envelope detection to convert this high-frequency signal into a signal for paper thickness detection (in this embodiment, a signal of 3 MHz). This band-converted signal is amplified by an amplifying circuit of the transistor 27. An output signal from the transistor 27 is supplied to the signal processing circuit (not shown) via the impedance matching circuit 11, and is also supplied to the AGC circuit 9. The AGC circuit 9 corrects deviation of the gain of the transistor 27 from the set gain range for paper thickness detection due to disturbance such as rumples or a rupture of the paper 1 and adjusts it in an optimal position in a linear region of the resonance frequency curve in FIG. 4.

According to this embodiment, the thickness of the paper 1 passing through the path 2 is detected in a non-contact state. Even if the running speed of the paper 1 is increased, therefore, the apparatus can reliably follow the paper 1 to correctly detect a change in paper thickness or overlapping of sheets of paper.

In this embodiment, a small change in electrostatic capacitance obtained when paper passes between the detecting and ground electrodes 14 and 15 is detected, and the thickness of the paper is detected by using a change in resonance point of the resonant circuit 7. Therefore, regardless of a simple arrangement of the apparatus, the paper thickness of interest can be detected with high precision.

In this embodiment, since the resonators of the oscillating circuit 6 and the resonant circuit 7 are constituted by the ceramic resonators 10 and 12, a large Q value with respect to the resonant circuit 7 can be obtained. In addition, since peripheral circuits of the resonant circuit 7, i.e., the impedance converting circuit 6a and a resonating circuit of the inductance element 21 and the capacitor 25 are constituted by high-impedance circuits, a small change in electrostatic capacitance can be detected with high sensitivity during an operation of the resonant circuit 7 without producing Q damp.

Furthermore, since the circuits 6a and 7 are constituted by the ceramic resonators 10 and 12 without using a strip line, the apparatus can have a very small size.

Note that the present invention is not limited to the above embodiment but can be variously modified. In addition, when the resonators of the oscillating circuit 6 and the resonant circuit 7 are made of materials having the same temperature characteristics, a paper thickness detecting apparatus having high temperature stability can be obtained.

Figure 5:
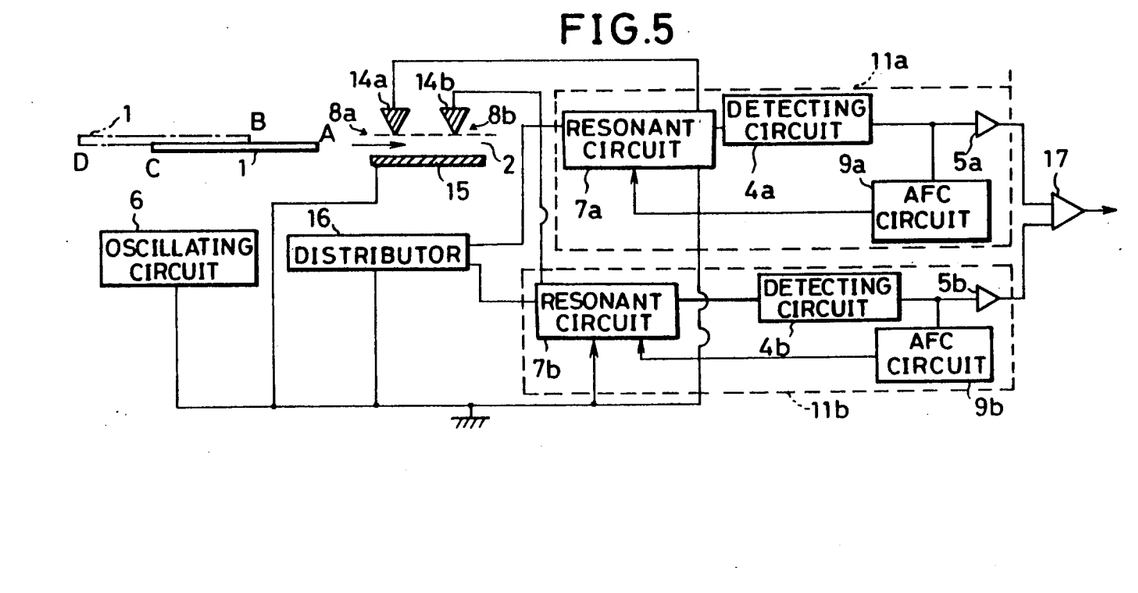
FIG. 5 is a block diagram showing the second embodiment of a paper thickness detecting apparatus according to the present invention.
Figure 6:
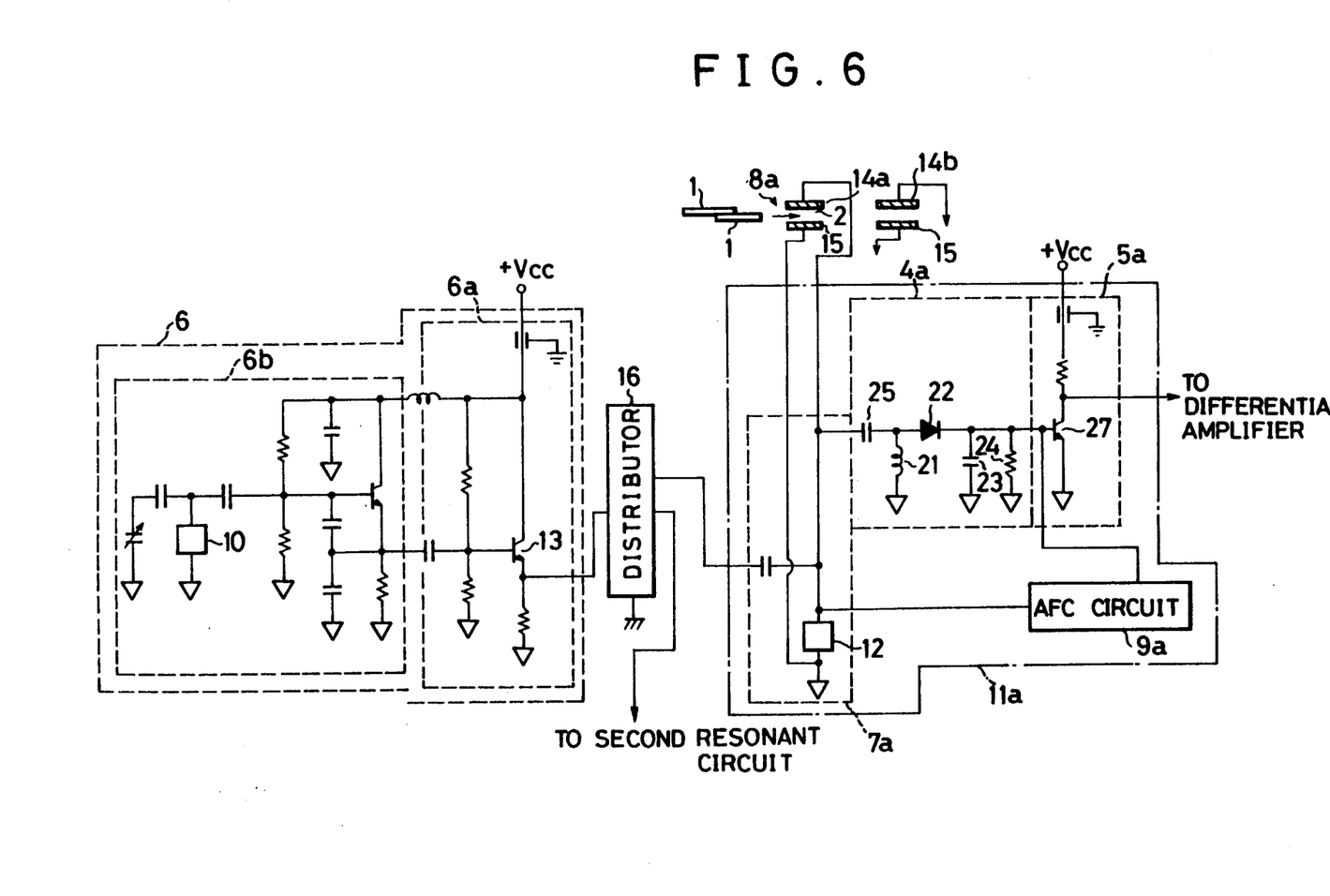
FIG. 6 is a circuit diagram showing the paper thickness detecting apparatus shown in FIG. 5.

FIG. 5 is a block diagram showing the second embodiment of a paper thickness detecting apparatus according to the present invention. Referring to FIG. 5, the apparatus of the second embodiment comprises an oscillating circuit 6, a distributor 16, a first sensor circuit 11a, a second sensor circuit 11b, a differential amplifier 17 as an output circuit, a first electrode detecting unit 8a, and a second electrode detecting unit 8b. The first electrode detecting unit 8a is constituted by a detecting electrode 14a and a ground electrode 15, and the second electrode detecting unit 8b is constituted by a detecting electrode 14b and the ground electrode 15. The ground electrode 15 and the detecting electrodes 14a and 14b are arranged to sandwich a running path region 2 of paper 1, i.e., arranged to oppose each other via a passing space of the paper 1. The detecting electrode 14a is arranged on the upstream side of the detecting electrode 14b. The first and second sensor circuits 11a and 11b have the same circuit arrangement. FIG. 6 is a circuit diagram showing in detail the oscillating circuit 6, the distributor 16, the first sensor circuit 11a, and the first electrode detecting unit 8a.

The oscillating circuit 6 is the same as the oscillating circuit in the first embodiment of the present invention. This oscillating circuit 6 oscillates an oscillation frequency signal having a high frequency and supplies the signal to the distributor 16 via a high impedance converting circuit 6a. The distributor 16 distributes this oscillation frequency signal to the first and second sensor circuits 11a and 11b. The sensor circuit 11a is constituted by a resonant circuit (first resonant circuit) 7a, a wave detecting circuit 4a, an AFC circuit (automatic frequency control circuit) 9a, and an amplifying circuit 5a. Similar to the resonant circuit 7 in the first embodiment of the present invention, the resonant circuit 7a is constituted by a ceramic resonator 12, and the detecting electrode 14a of the electrode detecting unit 8a is connected to the signal input side of the resonant circuit 7a. Note that the ground electrode 15 is connected to the ground side of the resonant circuit 7a.

A fixed oscillation frequency $f_{OSC}$ of the oscillating circuit 6 is slightly deviated from a resonance frequency $f_2$ of the resonant circuit 7a as similarly shown in FIG. 4. The resonance frequency $f_2$ of the resonant circuit 7a is shifted in accordance with a change in electrostatic capacitance between the electrodes 14a and 15 detected by the electrode detecting unit 8a, e.g., shifted to $f_1$ when an electrostatic capacitance C changes by $+\Delta C$. Since the oscillation frequency of the oscillating circuit 6 is fixed at $f_{OSC}$, the resonant circuit 7a supplies an output voltage $V_2$ at a resonance point $A_2$ when the electrostatic capacitance does not change. When the electrostatic capacitance changes to $+\Delta C$, however, the resonance frequency is shifted to $f_1$, the resonance point changes from $A_2$ to $A_1$, and the resonant circuit 7a supplies an output voltage $V_1$. In this manner, the resonance frequency of the resonant circuit 7a is shifted in accordance with the change in electrostatic capacitance between the electrodes 14a and 15, and the resonant circuit 7a supplies the output voltage V corresponding to the electrostatic capacitance change.

Similar to the wave detecting circuit 4 in the first embodiment of the present invention, the wave detecting circuit 4a receives an output signal from the resonant circuit 7a via a coupling capacitor 25. The wave detecting circuit 4a envelope-detects the output signal output from the resonant circuit 7a and having a high frequency, converts the signal into a signal having a signal band for detecting a paper thickness, and supplies the converted signal to the amplifying circuit 5a and the AFC circuit 9a.

Similar to the amplifying circuit 5 in the first embodiment of the present invention, the amplifying circuit 5a amplifies the signal from the wave detecting circuit 4a and supplies the amplified signal to the differential amplifier.

The AFC circuit 9a prevents the resonance point from falling outside the set frequency range for paper thickness detection due to disturbance such as rumples or a rupture of the paper 1, thereby enabling correct detection of a paper thickness even if the paper 1 has a rupture or rumples.

As described above, this embodiment includes the second sensor circuit 11b having the same arrangement as that of the first sensor circuit 11a. The second sensor circuit 11b also receives the oscillation frequency signal supplied from the oscillating circuit 6 and distributed by the distributor 16 and performs the same circuit operation as that of the first sensor circuit.

A paper thickness detecting operation of the second embodiment of the present invention having the above arrangement will be described below.

While the paper 1 does not pass between the detecting electrodes 14a and 14b and the ground electrode 15, the fixed oscillation frequency $f_{OSC}$ of the oscillating circuit 6 is slightly deviated from the resonance frequency $f_2$ of the resonant circuits 7a and 7b, as shown in FIG. 4. In this case, the resonant circuits 7a and 7b output a constant voltage $V_2$. In this state, when one sheet of the paper 1 (paper of N=1 where N is the number of sheets of paper) is fed from the path (running path region) 2 of the paper 1 and its leading edge enters between the detecting electrode 14a and the ground electrode 15, the electrostatic capacitance between the electrodes 14a and 15 changes. In response to this small change in electrostatic capacitance, the resonance frequency of the resonant circuit 7a on the first sensor circuit 11a is shifted from $f_2$ to $f_1$, the resonance point changes from $A_2$ to $A_1$, and the resonant circuit 7a outputs a voltage $V_1$. Similarly, when two sheets of the paper 1 enter between the electrodes 14a and 15 through the path 2, the electrostatic capacitance between the electrodes 14a and 15 further changes, the resonance frequency of the resonant circuit 7a is shifted to $f_0$, the resonance point changes from $A_1$ to $A_0$, and the resonant circuit 7a outputs a voltage $V_0$.

Similarly, when the paper 1 passes between the detecting electrode 14b and the ground electrode 15, a change in electrostatic capacitance corresponding to the passing of the paper 1 is detected by the second electrode detecting unit 8b, the detection result is supplied to the resonant circuit 7b on the second sensor circuit 11b, and the circuit 7b outputs an output voltage corresponding to a paper thickness. The first and second resonant circuits form an AM wave from the changes in output voltages corresponding to the paper thickness and supply the formed waves as detection signals to the corresponding wave detecting circuits 4a and 4b. That is, the first resonant circuit 7a performs multiplication between the oscillation frequency $f_{OSC}$ and a change component $\Delta f$ of the resonance frequency corresponding to the change in paper thickness detected by the detecting electrode 14a and obtains the AM wave. Similarly, the second resonant circuit 7b performs multiplication between the oscillation frequency $f_{OSC}$ and a change component $\Delta f$ of the resonance frequency corresponding to the change in paper thickness detected by the detecting electrode 14b and obtains the AM wave. In this embodiment, since the oscillation frequency $f_{OSC}$ is 1 GHz, a detection signal as an AM wave is a signal of a high frequency corresponding to the change in paper thickness and having 1 GHz as the ceter. This high-frequency signal is supplied from each resonant circuit to a corresponding one of the wave detecting circuits 4a and 4b.

The wave detecting circuit 4a (4b) envelope-detects this high-frequency signal to convert the signal into a signal for detecting a paper thickness (in this embodiment, a signal having a frequency of 3 MHz). This band-converted signal is amplified by the amplifying circuit 5a (5b) and supplied to the differential amplifier 17. The band-converted signal is also supplied to the AFC circuit 9a (9b). The AFC circuit 9a (9b) corrects deviation of the resonance point from the set gain range for paper thickness detection due to disturbance such as rumples or a rupture of the paper 1 and adjusts it in an optimal position in a linear region of a resonance frequency curve having a high variation.

The differential amplifier 17 obtains a difference between the signals supplied from the amplifying circuits 5a and 5b and supplies the obtained differential output to a desired signal processing circuit (not shown).

Figure 7A:
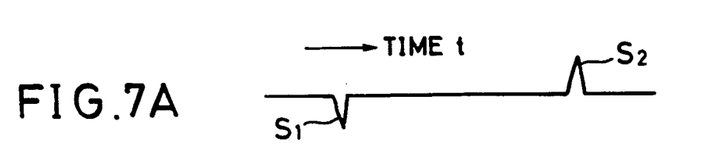
FIGS. 7A and 7B are timing charts for explaining waveforms of differential outputs of the paper thickness detecting apparatus of the embodiment shown in FIG. 5.
Figure 8:
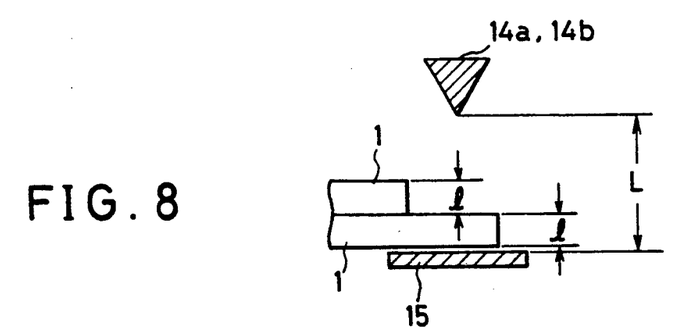
FIG. 8 is a view for explaining a relationship between a paper thickness change and an electrostatic capacitance change.

FIGS. 7A and 7B show waveforms of the differential output obtained by the differential amplifier 17. For example, when one sheet of the paper 1 runs through the running path region 2 and a leading end A of the paper 1 comes to a position immediately below the detecting electrode 14a, as indicated by a solid line in FIG. 5, a change in electrostatic capacitance between the detecting and ground electrodes 14a and 15 is detected not by the electrode detecting unit 8b but by the electrode detecting unit 8a. Therefore, as shown in FIG. 7A, the differential output between the first and second signals of the sensor circuits 11a and 11b appears as a peak S projecting in the negative direction. That is, assuming that the width of the space from the detecting electrodes 14a and 14b to the ground electrode 15 is L and the thickness of one sheet of paper is l, as shown in FIG. 8, an electrostatic capacitance C between the detecting electrodes 14a and 14b and the ground electrode 15 is determined by a space permittivity E, a permittivity $E_1$ of paper, a thickness nl (n is an integer) of the paper, and a space width L−nl. Subsequently, when the leading end A of the paper 1 comes to a position immediately below the detecting electrode 14b, a change in electrode capacitance is similarly detected by the electrode detecting unit 8b. Since this detected change component in electrostatic capacitance is equal to that detected by the electrode detecting unit 8a, the differential output becomes 0. When the paper 1 further moves in the running direction and a trailing end B of the paper 1 passes through the detecting electrode 14a, the electrostatic capacitance detected by the electrode detecting unit 8a changes, and the differential output from the differential amplifier 17 appears as a pulse waveform $S_2$ in the positive direction shown in FIG. 7A. A paper thickness can be obtained by analyzing peak voltages of the pulse waveforms $S_1$ and $S_2$, and a paper length can be obtained by analyzing a time width between the pulse waveforms $S_1$ and $S_2$.

Figure 7B:
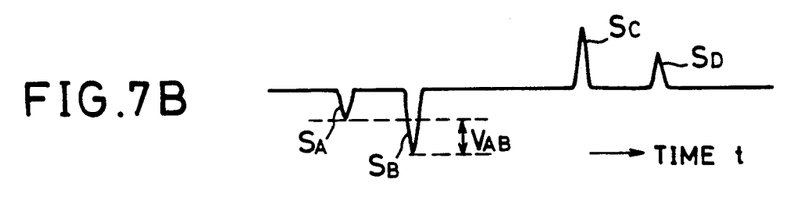
Figure 9:
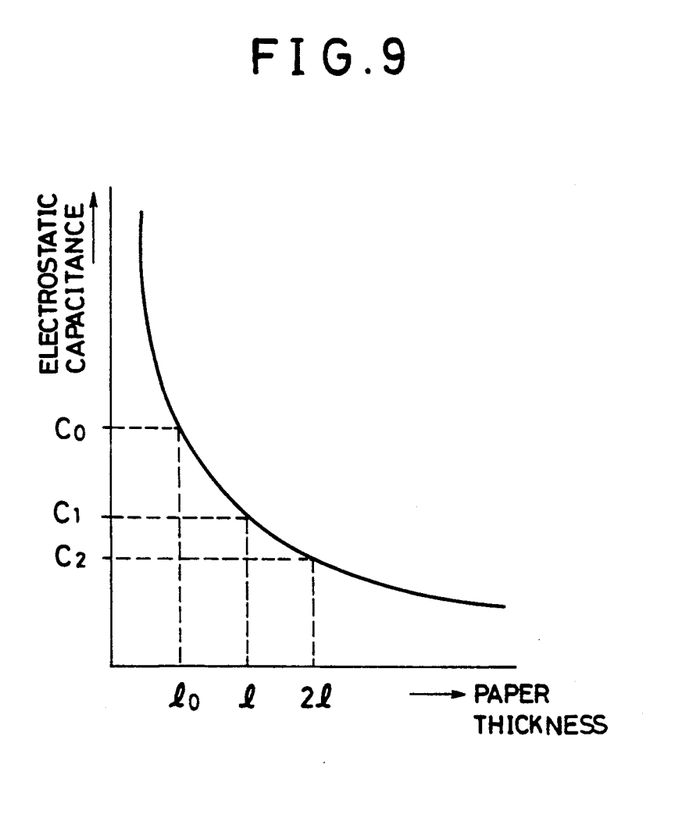
FIG. 9 is a graph for explaining a relationship between an electrostatic capacitance and a paper thickness.

Assume that two sheets of the paper 1 are simultaneously fed as indicated by a broken line shown in FIG. 5. In this case, as shown in FIG. 7B, the differential amplifier 17 outputs a pulse signal $S_A$ in the negative direction when a leading end A of the paper passes through the detecting electrode 14a, and the differential output becomes zero when the leading end A of the paper A reaches the detecting electrode 14b. A pulse waveform $S_B$ appears when a leading end B of the overlapping paper passes through the detecting electrode 14a, and the differential output becomes zero when the leading end B of the paper reaches the detecting electrode 14b. When a trailing end C of the paper reaches the detecting electrode 14a, a pulse waveform $S_C$ appears to project upward. When the trailing end C reaches the detecting electrode 14b, the differential output becomes zero. Subsequently, when a trailing end D of the overlapping paper passes through the detecting electrode 14a, a pulse waveform $S_D$ appears in the same polarity as that of $S_C$. Assuming that a thickness nl of paper, and more particularly, a thickness l of paper is kept unchanged, the height of a pulse waveform is determined by the number of sheets of paper. That is, as shown in FIG. 9, the electrostatic capacitance is in inverse proportion to the thickness of paper. More specifically, while the electrostatic capacitance is $C_0$ when no paper is present ($l_0$ in FIG. 9) between the detecting electrodes 14a and 14b and the ground electrode 15, it is $C_1$ and $C_2$ when one and two sheets of paper are present, respectively. By analyzing the differential signals from the differential amplifier 17, the presence/absence of two sheets of paper, the paper thickness, the dry/wet state of paper, the length of paper, and a deviation between two sheets of paper if two sheets of paper are simultaneously fed, and the like can be detected. That is, simultaneous feeding of two sheets of paper can be detected in accordance with appearance of the pulse waveform $S_B$ larger than the pulse waveform $S_A$. The paper thickness can be detected by obtaining a difference $V_{AB}$ between peak values of the pulse waveforms $S_A$ and $S_B$. The dry/wet state of paper can be determined by analyzing the value of $V_{AB}$. The length of the paper 1 can be obtained by an interval between the pulse waveforms $S_A$ and $S_C$. The deviation between two sheets of paper can be obtained on the basis of the interval between the pulse waveforms $S_A$ and $S_B$. When the detecting electrodes 14a and 14b are arranged close to each other and their electrode areas are minimized, a small deviation between two sheets of paper can be obtained with high precision.

According to this embodiment, the thickness of the paper 1 passing through the running path region 2 is detected in a non-contact state. Even if the running speed of the paper 1 is increased, therefore, the apparatus can reliably follow the movement of the paper to correctly detect a change in paper thickness or overlapping of sheets of paper.

In this embodiment, a small change in electrostatic capacitance obtained when paper passes between the detecting electrodes 14a and 14b and the ground electrode 15 is detected, and a paper thickness is detected by using changes in resonance points of the resonant circuits 7a and 7b. Regardless of a simple arrangement of the apparatus, therefore, a paper thickness of interest can be detected with high precision. In addition, since detection of a paper thickness or the like is performed on the basis of a signal indicating a difference between the detection signals on the first and second sensor circuits 11a and 11b, disturbance components of an environmental change such as a temperature or a humidity can be canceled to be removed. As a result, detection of a paper thickness or the like can be performed with high reliability.

In this embodiment, since the resonator of the oscillating circuit 6 and the resonators of the resonant circuits 7a and 7b are constituted by the ceramic resonators 10 and 12, a large Q value of the circuits 6b and 7 can be obtained. In addition, since peripheral circuits of the resonant circuit 7, i.e., the impedance converting circuit 6a and the resonating circuit of the inductance element 21 and the capacitor 25 are constituted by high-impedance circuits, a small change in electrostatic capacitance can be detected with high precision without producing Q damp during an operation of the resonant circuit.

Furthermore, since the resonators are constituted by the ceramic resonators 10 and 12 without using a strip line, the apparatus can have a very small size.

In the present invention, a pair of the front and rear electrode detecting units are arranged along the running path region of paper in a non-contact state with paper, and a paper thickness or the like is detected by using a change in electrostatic capacitance of electrode detection regions obtained when paper passes through the electrode detecting units in a non-contact state. Even if the running speed of the paper is increased, therefore, the apparatus can reliably follow the movement of the paper to correctly detect its thickness.

In addition, in the present invention, the resonance point of the resonant circuit is shifted by using a change in electrostatic capacitance corresponding to a change in paper thickness, thereby obtaining the paper thickness. Regardless of a simple arrangement of the apparatus, therefore, a small change in paper thickness can be correctly detected, and the manufacturing cost of the apparatus can be reduced. Furthermore, since the paper thickness is detected on the basis of a differential output between signals obtained by the first and second sensor circuits, disturbance components can be canceled to be removed. Therefore, information indicating, e.g. a paper thickness, overlapping of sheets of paper, a paper length, or a deviation between overlapped sheets of paper can be detected with high sensitivity, high precision, and high reliability, resulting in a very large technical value.

What is claimed is:

1. A paper thickness detecting apparatus comprising:
   an electrode detecting unit constituted by a ground electrode and a detecting electrode arranged in upper and lower positions of a running path of paper to oppose each other;
   an oscillating circuit unit for generating an oscillation frequency signal;
   a resonant circuit, different from said oscillating circuit unit, for shifting a resonance point in response to a change in electrostatic capacitance corresponding to a change in paper thickness detected by said electrode detecting unit said resonant circuit having a resonator with a first resonance point impedance, a high-impedance converting circuit which has high impedance to alternating signal current is connected between said oscillating circuit unit and said resonant circuit the impedance of said high-impedance converting circuit being greater than resonance point impedance of said resonator;

a signal detecting circuit for detecting an output of said resonant circuit for envelope-detecting an output signal from said resonant circuit; and a high impedance circuit for connecting between said resonant circuit and said signal detecting circuit.

2. A paper thickness detecting apparatus according to claim 1 further comprising an amplifying circuit for amplifying an output of said detecting circuit.

3. A paper thickness detecting apparatus according to claim 2 further comprising an automatic gain control circuit for controlling gain of the output of said amplifying circuit.

4. A paper thickness detecting apparatus according to claim 1 wherein both said oscillating circuit unit and said resonant circuit include ceramic resonators.

5. A paper thickness detecting apparatus comprising:

a detecting unit including first and second detecting electrodes arranged along a running path of paper each opposing a ground electrode;

a signal oscillating circuit for generating an oscillation frequency signal said oscillating circuit including an oscillating circuit unit;

a first sensor circuit including a first resonator with a first impedance for shifting a resonance point in response to a change in electrostatic capacitance detected by said first detecting electrode said first sensor circuit also having a first wave detecting circuit for envelope-detecting an output of said first resonator;

a second sensor circuit including a second resonator with a second impedance for shifting a resonance point in response to a change in electrostatic capacitance detected by said second detecting electrode said second sensor circuit having a second wave detecting circuit for envelope-detecting an output of said second resonator;

a high-impedance converting circuit connected between said oscillating circuit unit and said first and second sensor circuits, the impedance of said high-impedance converting circuit being greater than said impedance of said first and second resonators;

connecting means for connecting said high-impedance converting circuit and said first and second sensor circuits; and an output circuit for outputting a signal indicating a difference between the detection signals from said first and second sensor circuits.

6. A paper thickness detecting apparatus according to claim 5 wherein said connecting means is a distributor for distributing said oscillation frequency signal to said first and second sensor circuits.

7. A paper thickness detecting apparatus according to claim 5 wherein said detecting unit comprises said first and second detecting electrodes and a common ground electrode to oppose each other with respect to a passing space of a paper.

8. A paper thickness detecting apparatus according to claim 5 wherein said output circuit comprises a differential amplifier.

9. A paper thickness detecting apparatus according to claim 5 wherein each sensor circuit includes an amplifying circuit for amplifying a signal from said detecting unit and an automatic frequency control circuit means to prevent said resonance points from falling outside a set frequency range.

* * * * *